US012771815B2

(12) United States Patent
Chiu et al.

(10) Patent No.: US 12,771,815 B2
(45) Date of Patent: Oct. 20, 2026

(54) STEREOSCOPIC CAMERA DEVICE

(71) Applicant: Acer Incorporated, New Taipei City (TW)

(72) Inventors: Yi-Jung Chiu, New Taipei City (TW); Wei-Kuo Shih, New Taipei City (TW); Chao-Kuang Yang, New Taipei City (TW); Tsung-Wei Tu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 416 days.

(21) Appl. No.: 18/513,614

(22) Filed: Nov. 19, 2023

(65) Prior Publication Data

US 2025/0030827 A1 Jan. 23, 2025

(30) Foreign Application Priority Data

Jul. 19, 2023 (TW) ................................ 112126884

(51) Int. Cl.
*H04N 13/204* (2018.01)
*G06V 10/74* (2022.01)

(52) U.S. Cl.
CPC ......... *H04N 13/204* (2018.05); *G06V 10/761* (2022.01)

(58) Field of Classification Search
CPC .. H04N 13/204; H04N 13/239; H04N 13/261; H04N 13/296; G06V 10/761
See application file for complete search history.

(56) References Cited

U.S. PATENT DOCUMENTS

| | | | | |
|---|---|---|---|---|
| 8,358,322 | B2 * | 1/2013 | Yeo | G02F 1/133707 345/107 |
| 9,532,027 | B2 * | 12/2016 | Nolan | H04N 13/128 |
| 2009/0160934 | A1 * | 6/2009 | Hendrickson | G03B 35/08 348/47 |
| 2014/0028802 | A1 * | 1/2014 | Hendrickson | H04N 13/275 348/47 |
| 2016/0165130 | A1 * | 6/2016 | Cleveland | G06F 3/0325 348/47 |

FOREIGN PATENT DOCUMENTS

| | | |
|---|---|---|
| CN | 110288642 | 9/2019 |
| CN | 112752068 | 5/2021 |
| TW | M387510 | 9/2010 |
| TW | 201813369 | 4/2018 |

* cited by examiner

*Primary Examiner* — Tom Y Lu
(74) *Attorney, Agent, or Firm* — JCIPRNET

(57) ABSTRACT

A stereoscopic camera device, including a first camera, a second camera, and a controller, is provided. The first camera is configured to capture toward an object to obtain a first image of the object. The second camera is configured to capture toward the object to obtain a second image of the object. The controller synthesizes the images to generate a stereoscopic image of the object. By the controller, the cameras are controlled, so that toe-in angles of an optical axis of the first camera and an optical axis of the second camera are greater than 0. The controller image processes the first image and the second image, so that the processed first image and the processed second image are equivalent to images captured when the toe-in angles of the optical axis of the first camera and the optical axis of the second camera are greater than 0.

13 Claims, 11 Drawing Sheets

STEREOSCOPIC CAMERA DEVICE

CROSS-REFERENCE TO RELATED APPLICATION

This application claims the priority benefit of Taiwan application serial no. 112126884, filed on Jul. 19, 2023. The entirety of the above-mentioned patent application is hereby incorporated by reference herein and made a part of this specification.

BACKGROUND

Technical Field

The disclosure relates to a camera device, and in particular to a stereoscopic camera device.

Description of Related Art

The principle of stereoscopic vision experienced by the human eyes is that there is a spacing between the left and right eyes, so the left and right eyes see different images. Based on this principle, the stereoscopic camera device on the market uses two cameras to capture objects with optical axes parallel to each other, and then synthesize the captured images into a stereoscopic image.

However, the stereoscopic image captured by the stereoscopic camera device currently on the market have the following issues. When the stereoscopic image is presented (such as through a 3D display), the vergence of both eyes does not match the accommodation of both eyes, that is, there is visual vergence-accommodation conflict (VAC), thus causing visual fatigue and physical discomfort. In addition, the capturing manner of the stereoscopic camera device cannot display the stereoscopic image behind the screen and is not suitable for close-range capturing.

SUMMARY

The disclosure provides a stereoscopic camera device, which can effectively reduce visual vergence-accommodation conflict of a stereoscopic image and provide optimal stereoscopic visual effects.

An embodiment of the disclosure provides a stereoscopic camera device, which includes a first camera, a second camera, and a controller. The first camera is configured to capture toward an object to obtain a first image of the object. The second camera is configured to capture toward the object to obtain a second image of the object. The controller is electrically connected to the first camera and the second camera. The controller synthesizes the first image and the second image to generate a stereoscopic image of the object. By the controller, the first camera and the second camera are controlled, so that toe-in angles of an optical axis of the first camera and an optical axis of the second camera are greater than 0. Alternatively, the controller image processes the first image and the second image, so that the processed first image and the processed second image are equivalent to images captured when the toe-in angles of the optical axis of the first camera and the optical axis of the second camera are greater than 0.

Based on the above, the first camera and the second camera in the stereoscopic camera device can be controlled, so that the toe-in angles of the optical axis of the first camera and the optical axis of the second camera are greater than 0. Alternatively, the controller image processes the first image and the second image, so that the processed first image and the processed second image are equivalent to the images captured when the toe-in angles of the optical axis of the first camera and the optical axis of the second camera are greater than 0. Therefore, the stereoscopic camera device can present the stereoscopic image in front of or behind a 3D screen, and the stereoscopic camera device can be suitable for close-range capturing.

DESCRIPTION OF THE EMBODIMENTS

Figure 1:
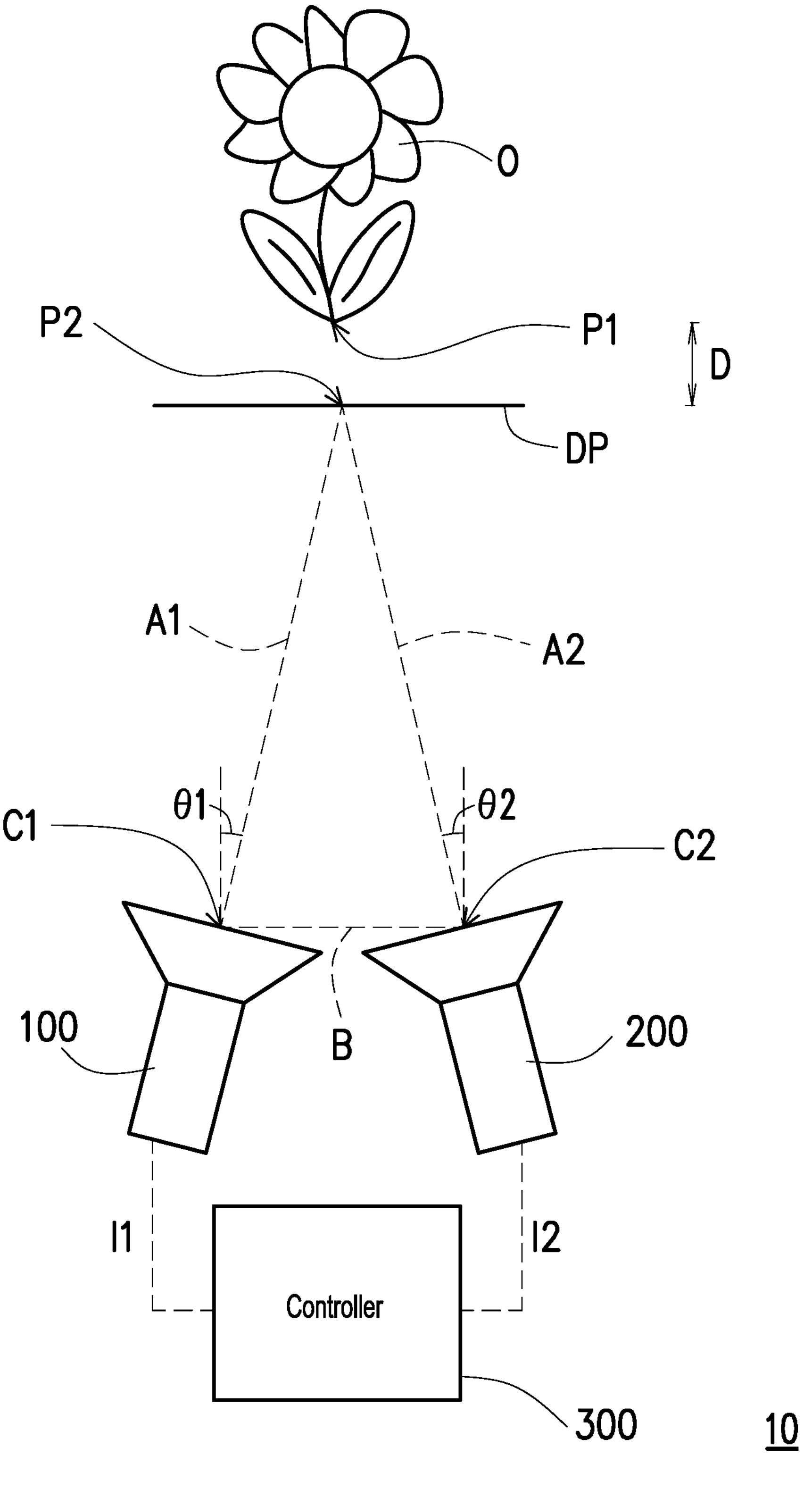
FIG. 1 is a schematic diagram of a stereoscopic camera device according to an embodiment of the disclosure.

FIG. 1 is a schematic diagram of a stereoscopic camera device according to an embodiment of the disclosure. Please refer to FIG. 1. An embodiment of the disclosure provides a stereoscopic camera device 10, which includes a first camera 100, a second camera 200, and a controller 300.

In the embodiment, the first camera 100 and the second camera 200 may be complementary metal-oxide semiconductor (CMOS) cameras or charge coupled device (CCD) cameras, but the disclosure is not limited thereto. The first camera 100 is configured to capture toward an object O to obtain a first image I1 of the object O. The second camera 200 is configured to capture toward the object O to obtain a second image I2 of the object O.

In the embodiment, the controller 300 includes, for example, a microcontroller unit (MCU), a central processing unit (CPU), a microprocessor, a digital signal processor (DSP), a programmable controller, a programmable logic device (PLD), other similar devices, or a combination of the devices, but the disclosure is not limited thereto. In addition, in an embodiment, each function of the controller 300 may be implemented as multiple program codes. The program codes are stored in a memory and the controller 300 executes the program codes. Alternatively, in an embodiment, each function of the controller 300 may be implemented as one or more circuits. The disclosure is not limited to using software or hardware to implement each function of the controller 300.

In the embodiment, the controller 300 is electrically connected to the first camera 100 and the second camera 200. The controller 300 synthesizes the first image I1 and the second image 12 to generate a stereoscopic image of the object O. By the controller 300, the first camera 100 and the second camera 200 are controlled, so that toe-in angles θ1 and θ2 of an optical axis A1 of the first camera 100 and an optical axis A2 of the second camera 200 are greater than 0.

Figure 2:
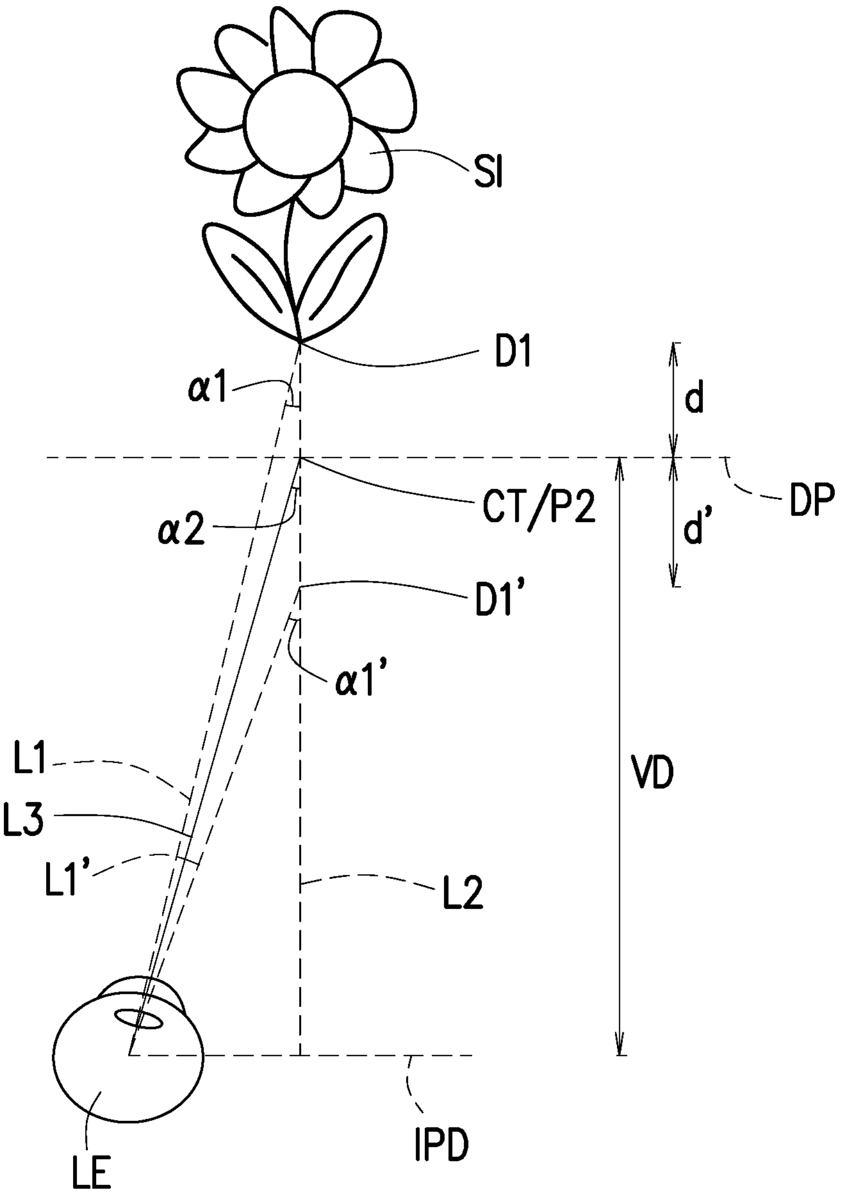
FIG. 2 is a schematic diagram of a stereoscopic image captured by a stereoscopic camera device relative to both eyes according to an embodiment of the disclosure.

FIG. 2 is a schematic diagram of a stereoscopic image captured by (such as using) a stereoscopic camera device relative to both eyes according to an embodiment of the disclosure. Please refer to FIG. 1 and FIG. 2 at the same time. In the embodiment, distances d and d' between imaging positions D1 and D1' of the stereoscopic image SI of the object O and a display surface DP are greater than 0, wherein an intersection position P2 of the optical axis A1 of the first camera 100 and the optical axis A2 of the second camera 200 falls on the display surface DP, the display surface DP is parallel to a base line B, and a straight line formed between the first camera 100 and the second camera 200 is the base line B.

In a preferred embodiment, a difference value between included angles α1 and α1' formed by first straight lines L1 and L1' and a second straight line L2 and an included angle α2 formed by a third straight line L3 and the second straight line L2 falls between ±0.5 degrees, wherein straight lines formed between the imaging positions D1 and D1' of the stereoscopic image SI of the object O and a position of a preset left eye LE or a preset right eye are the first straight lines L1 and L1', a straight line formed perpendicular to a connection direction between the position of the preset left eye LE and the position of the preset right eye and toward a direction of the stereoscopic image SI is the second straight line L2, and a straight line formed between a center of sight CT of the preset left eye LE and the preset right eye on the display surface DP and the position of the preset left eye LE or the preset right eye is the third straight line L3.

In detail, the first camera 100 and the second camera 200 respectively capture toward the object O at positions C1 and C2, and the intersection position (that is, a focus position) P2 of the optical axis A1 of the first camera 100 and the optical axis A2 of the second camera 200 defines the display surface DP, as shown in FIG. 1. In other words, the stereoscopic image SI synthesized by the stereoscopic camera device 10 is, for example, presented by a 3D display (but the disclosure is not limited thereto), and a display surface of the 3D display is the display surface DP of FIG. 1 or FIG. 2. When the stereoscopic image SI is presented, the stereoscopic image SI located between the display surface DP and a viewer produces the effect of the image floating from the display, and the display surface DP located between the stereoscopic image SI and the viewer produces the effect of the image sinking into the display. For example, when the imaging position of the stereoscopic image SI is at D1, the stereoscopic image SI sinks into the display; and when the imaging position of the stereoscopic image SI is at D1', the stereoscopic image SI floats from the display. When the imaging position of the stereoscopic image SI is located on the display surface DP, the stereoscopic image SI does not present a 3D effect.

In addition, when capturing, if the object O is located between the display surface DP and the first camera 100 or the second camera 200, the stereoscopic image SI is located between the display surface DP and the viewer. On the contrary, if the display surface DP is located between the object O and the first camera 100 or the second camera 200, the display surface DP is located between the stereoscopic image SI and the viewer. For example, when the display surface DP is located between the object O and the first camera 100 or the second camera 200, the imaging position of the stereoscopic image SI is at D1; and when the object O is located between the display surface DP and the first camera 100 or the second camera 200, the imaging position of the stereoscopic image SI is at D1'.

Based on the above, in the embodiment, since the generated image is required to have a 3D effect visually, the condition that the distances d and d' between the imaging positions D1 and D1' of the stereoscopic image SI of the object O and the display surface DP are greater than 0 must be satisfied or the condition that the distance D between the position P1 of the object O and the display surface DP is greater than 0 must be satisfied. However, in a preferred embodiment, when the difference value between the included angles α1 and α1' and the included angle α2 falling between ±0.5 degrees is satisfied, the stereoscopic camera device 10 can further effectively reduce visual vergence-accommodation conflict of the stereoscopic image SI and provide optimal stereoscopic effects.

TABLE 1

| Viewing distance VD | Imaging position D1' | Imaging position D1 |
|---|---|---|
| 400 | 360 | 450 |
| 500 | 439 | 580 |
| 550 | 478 | 648 |
| 600 | 515 | 719 |
| 700 | 587 | 867 |
| 800 | 656 | 1026 |
| 900 | 721 | 1196 |
| 1000 | 784 | 1379 |
| 1100 | 844 | 1577 |
| 1200 | 902 | 1701 |
| 1300 | 958 | 2023 |
| 1400 | 1011 | 2276 |
| 1500 | 1062 | 2553 |

For example, Table 1 above shows values of the stereoscopic image SI respectively at the imaging position D1' (the difference value between the included angle α1' and the included angle α2 is ±0.5 degrees) and the imaging position D1 (the difference value between the included angle α1 and the included angle α2 is −0.5 degrees) under different viewing distances (that is, distances between the human eyes and the display surface DP) VD, wherein the unit of each value is mm.

Figure 3:
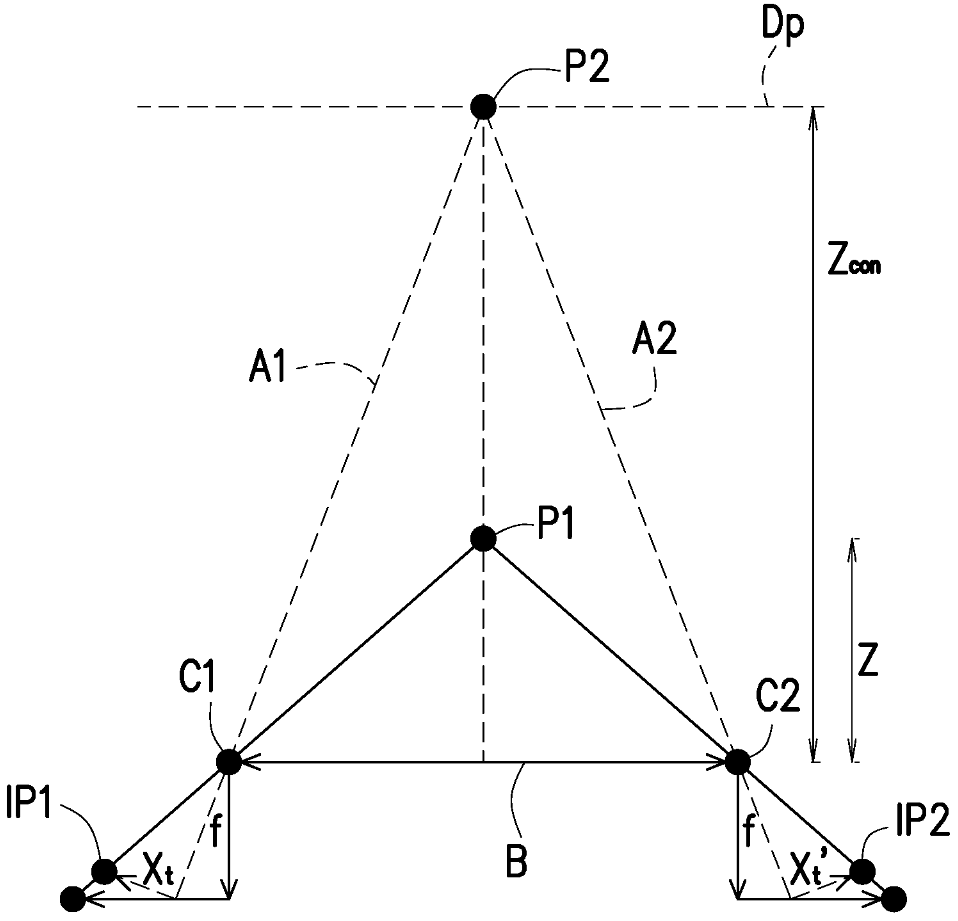
FIG. 3 is a schematic diagram of an object relative to a first camera and a second camera when a stereoscopic camera device captures the object according to an embodiment of the disclosure.
Figure 4:
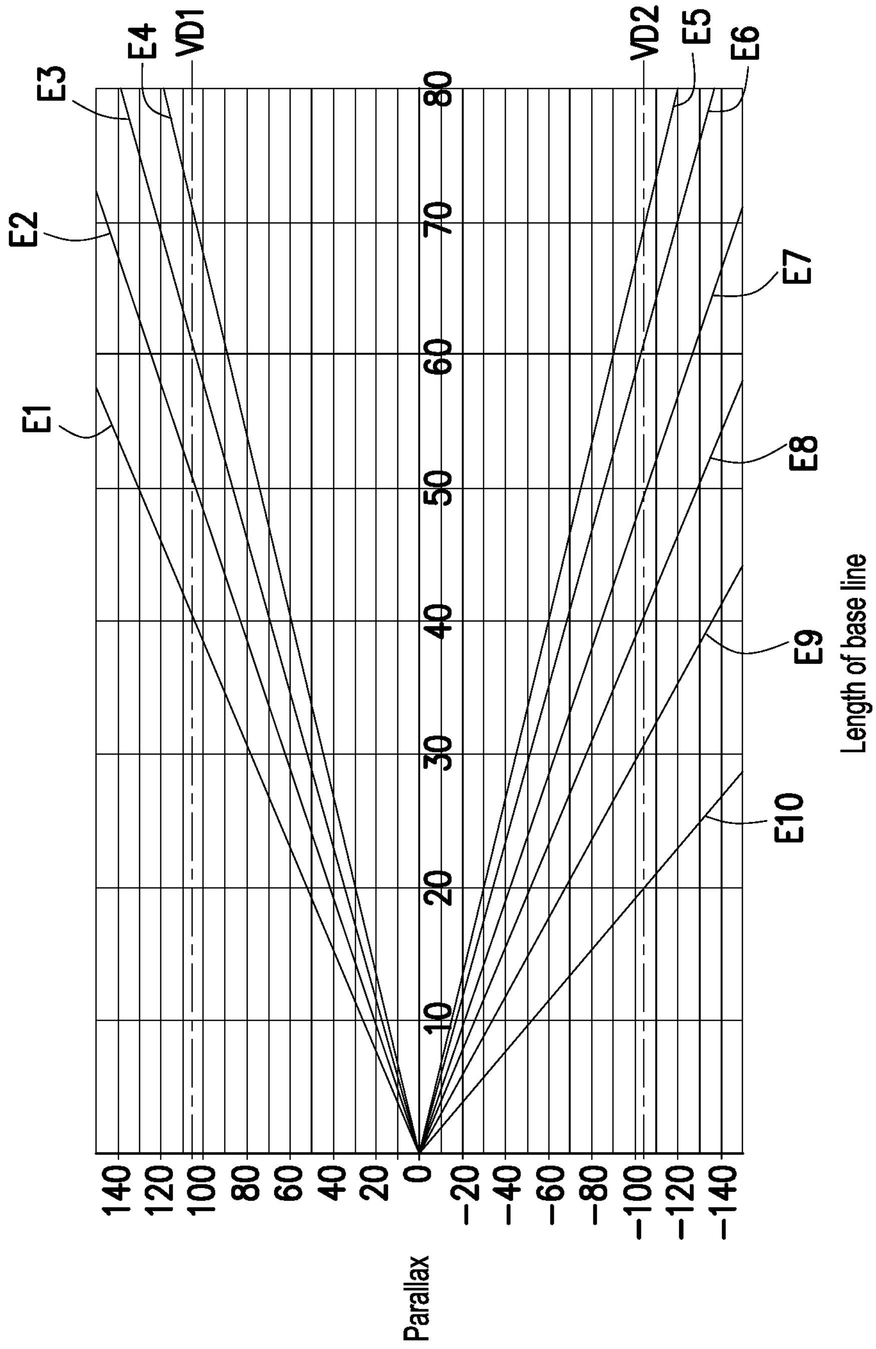
FIG. 4 is a graph of parallax against length of base line when $Z_{con}$ is 600 mm of a stereoscopic camera device according to an embodiment of the disclosure.

FIG. 3 is a schematic diagram of an object relative to a first camera and a second camera when a stereoscopic camera device captures the object according to an embodiment of the disclosure. FIG. 4 is a graph of parallax against length of base line when $Z_{con}$ is 600 mm of a stereoscopic camera device according to an embodiment of the disclosure. Please refer to FIG. 3 and FIG. 4. In the embodiment, the controller 300 determines a length of the base line B according to the shortest distance $Z_{con}$ between the display surface DP and the base line B, a preset viewing distance VD, and a base line function, wherein the preset viewing distance VD is a distance between the position of the preset left eye LE or the preset right eye and the display surface DP, and the straight line formed between the first camera 100 and the second camera 200 is the base line B. The base line function is:

$$(x_t - x_t') = f\left(\frac{\frac{B'}{Z} - \frac{B'}{Z_{con}}}{1 + \frac{B^2}{4ZZ_{con}}}\right)$$

where ($x_t$-$x_t$') is a parallax between the first image I1 and the second image I2, $x_t$ is a distance between the first image I1 at an imaging point IP1 of the first camera 100 and the optical axis A1 of the first camera 100, $x_t$' is a distance between the second image 12 at an imaging point IP2 of the second camera 200 and the optical axis A2 of the second camera 200, f is a focal length of the first camera 100 and the second camera 200, B' is the length of the base line B, Z is a shortest distance between the object O and the base line B, and $Z_{con}$ is the shortest distance between the display surface DP and the base line B.

In the embodiment, the controller 300 further determines a capturable range of the object O according to the shortest distance $Z_{con}$ between the display surface DP and the base line B, the preset viewing distance VD, and the base line function.

For example, in FIG. 4, the vertical axis is the parallax, and the horizontal axis is the length of the base line B. When the parallax is positive, the stereoscopic image SI sinks into the display. When the parallax is negative, the stereoscopic image SI floats from the display. Curves VD1 and VD2 both represent straight lines formed when the viewing distance VD is 600 mm. Curves E1, E2, E3, E4, E5, E6, E7, E8, E9, and E10 are curves of the base line function when a shortest distance Z (that is, a capturing object distance between the base line B and the object O shown in FIG. 3) is respectively infinitely far, 3000 mm, 1800 mm, 1400 mm, 380 mm, 360 mm, 330 mm, 300 mm, 260 mm, and 200 mm. For example, intersection points of the plot VD1 and the plot E4 and the plot VD2 and the plot E5 fall on the base line B with a length of 70 mm. Therefore, when $Z_{con}$ is 600 mm and VD is 600 mm, the length of the base line B may be selected as 70 mm, and the capturable range of the object O is preferably 380 mm to 1400 mm.

Figure 5:
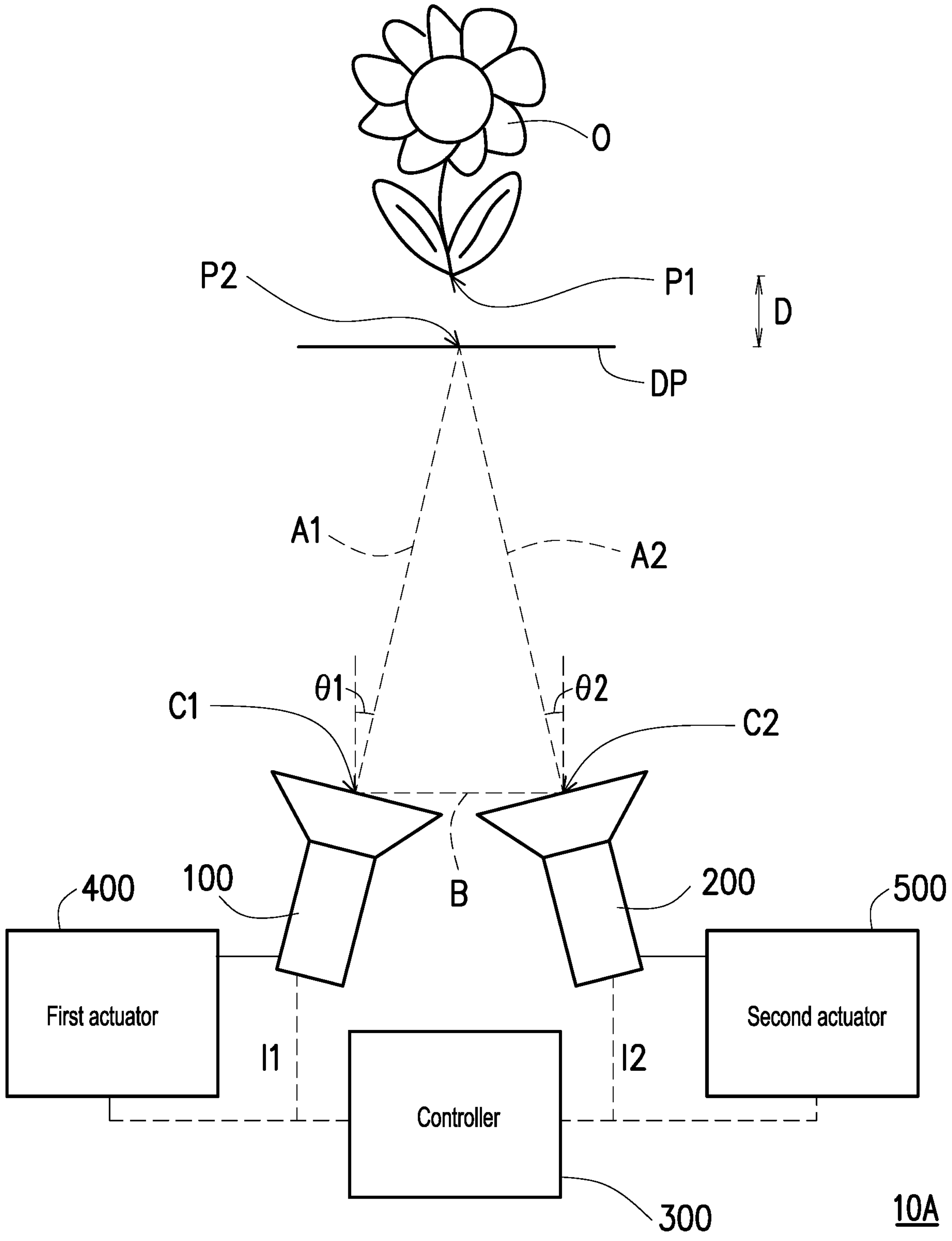
FIG. 5 is a schematic diagram of a stereoscopic camera device according to an embodiment of the disclosure.

FIG. 5 is a schematic diagram of a stereoscopic camera device according to an embodiment of the disclosure. Please refer to FIG. 5. A stereoscopic camera device 10A is similar to the stereoscopic camera device 10. The main difference is that the stereoscopic camera device 10A further includes a first actuator 400 and a second actuator 500. In the embodiment, the first actuator 400 and the second actuator 500 include, for example, driving devices such as motors and stepper motors.

In the embodiment, the first actuator 400 is connected to the first camera 100 and is electrically connected to the controller 300. The first actuator 400 is configured to change the angle of the optical axis A1 of the first camera 100 and the position C1 of the first camera 100. The second actuator 500 is connected to the second camera 200 and is electrically connected to the controller 300. The second actuator 500 is configured to change the angle of the optical axis A2 of the second camera 200 and the position C2 of the second camera 200.

Figure 6:
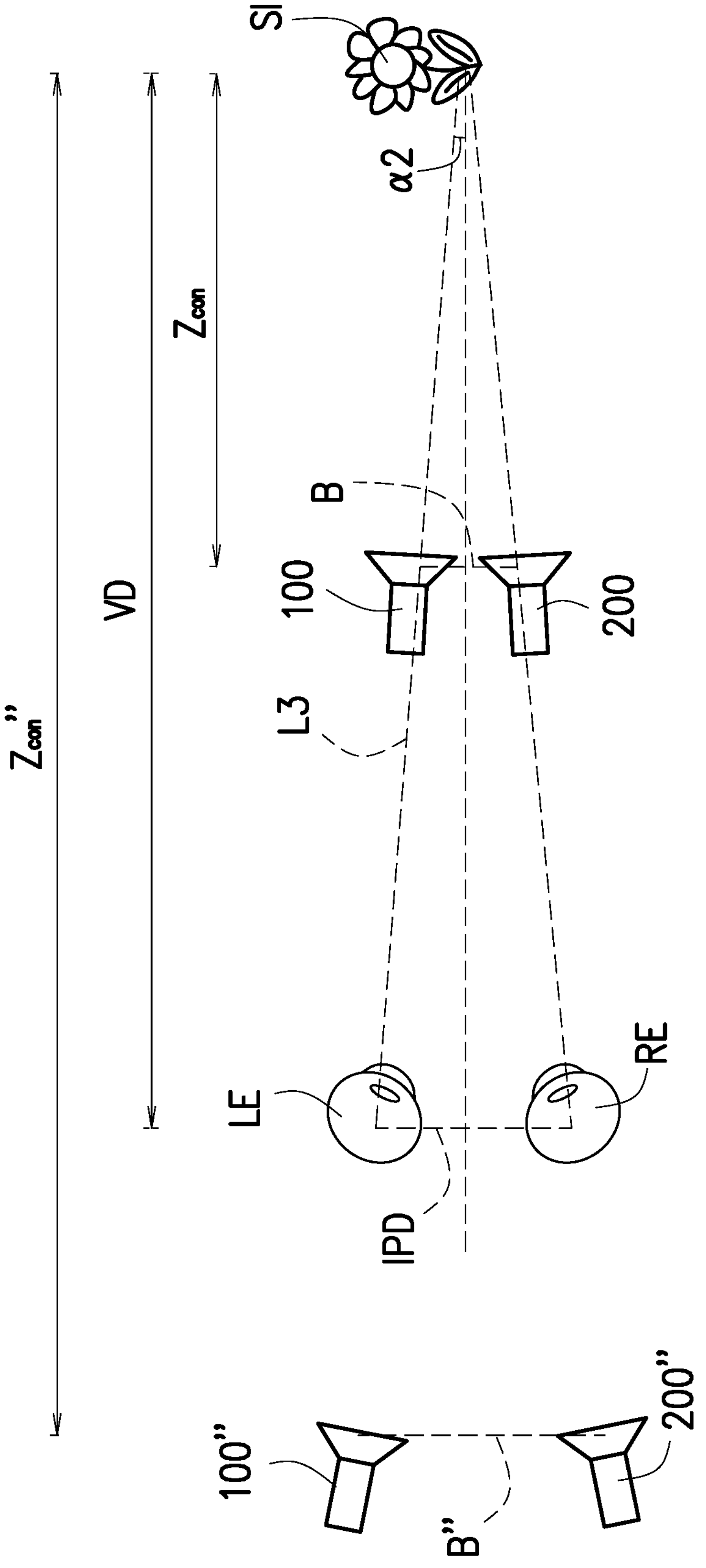
FIG. 6 is a schematic diagram of a length of a base line relative to a capturing distance of a stereoscopic camera device according to an embodiment of the disclosure.

In the embodiment, the controller 300 controls the first actuator 400 and the second actuator 500 according to the capturing object distance (that is, the shortest distance Z), the preset viewing distance VD, and a preset interpupillary distance (for example, a distance of a straight line IPD formed between the left eye LE and the right eye RE shown in FIG. 2 or 6) to change the toe-in angle θ1 of the first camera 100, the toe-in angle θ2 of the second camera 200, or the distance between the first camera 100 and the second camera 200 (that is, the length of the base line B).

FIG. 6 is a schematic diagram of a length of a base line relative to a capturing distance of a stereoscopic camera device according to an embodiment of the disclosure. Please refer to FIG. 6. In the embodiment, the distance between the first camera 100 and the second camera 200 is proportional to the capturing distance. When the capturing distance (for example, the shortest distance $Z_{con}$) is less than the viewing distance VD, the length of the base line B may be reduced. When the capturing distance (for example, a shortest distance $Z_{con}$" between a first camera 100" and a second camera 200") is greater than the viewing distance VD, the length of the base line B" may be increased.

Based on the above, in an embodiment of the disclosure, since the stereoscopic camera device 10A is provided with the first actuator 400 and the second actuator 500, the stereoscopic camera device 10A may change the angle of the optical axis A1 of the first camera 100, the position C1 of the first camera 100, the angle of the optical axis A2 of the second camera 200, and the position C2 of the second camera 200 by the first actuator 400 and the second actuator 500. Therefore, the stereoscopic camera device 10A may change a spacing between and the angles of the first camera 100 and the second camera 200 in coordination with the capturing distance. The remaining advantages of the stereoscopic camera device 10A are similar to those of the stereoscopic camera device 10 and will not be described again here.

Figure 7:
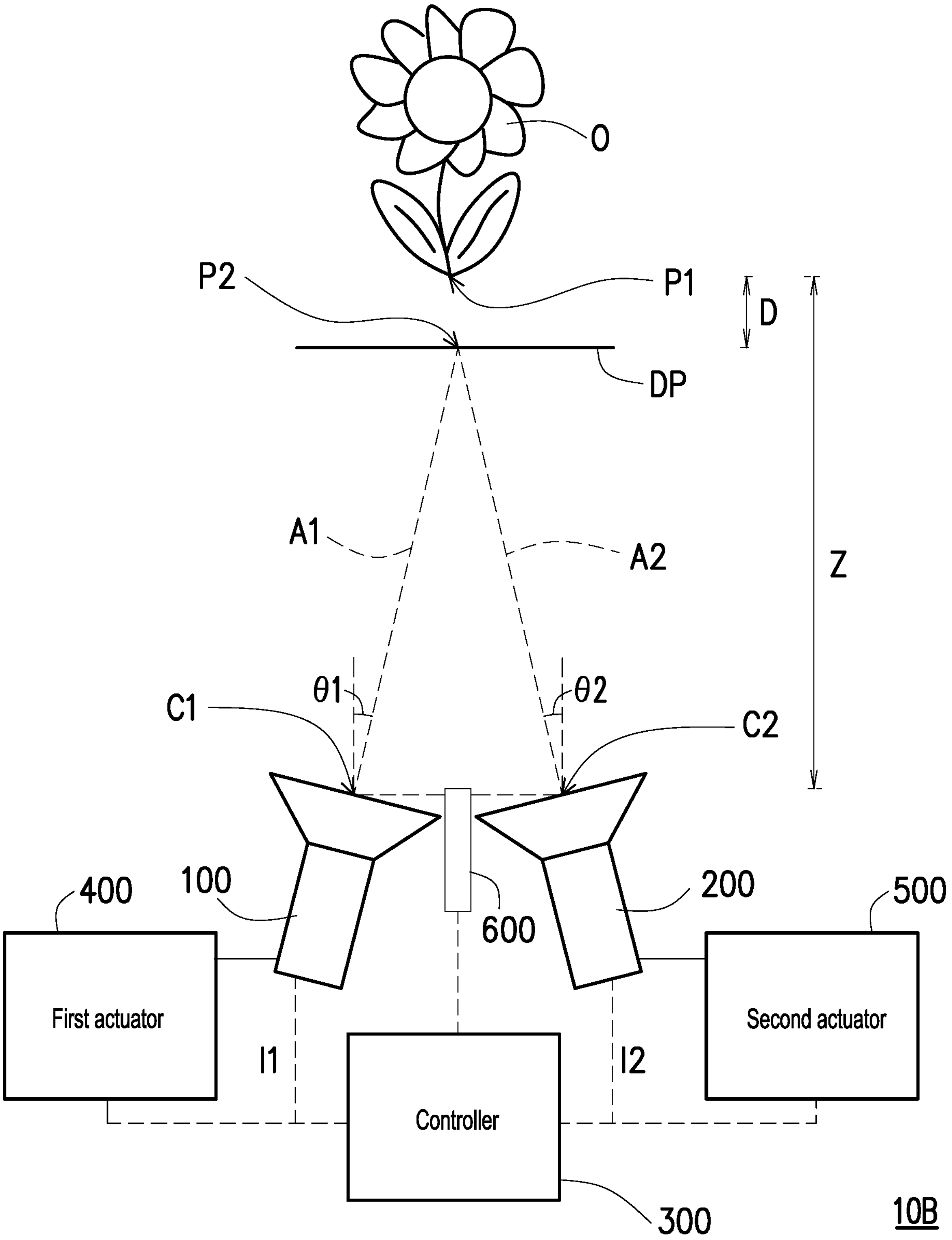
FIG. 7 is a schematic diagram of a stereoscopic camera device according to an embodiment of the disclosure.

FIG. 7 is a schematic diagram of a stereoscopic camera device according to an embodiment of the disclosure. Please refer to FIG. 7. A stereoscopic camera device 10B is similar to the stereoscopic camera device 10A. The main difference is that the stereoscopic camera device 10B further includes a distance sensor 600. In the embodiment, the distance sensor 600 is, for example, a time-of-flight ranging sensor, an ultrasonic sensor, an infrared distance sensor, or other distance sensors.

In the embodiment, the distance sensor 600 is electrically connected to the controller 300. The distance sensor 600 is configured to sense the capturing object distance (that is, the shortest distance Z) between the base line B and the object O.

Figure 8:
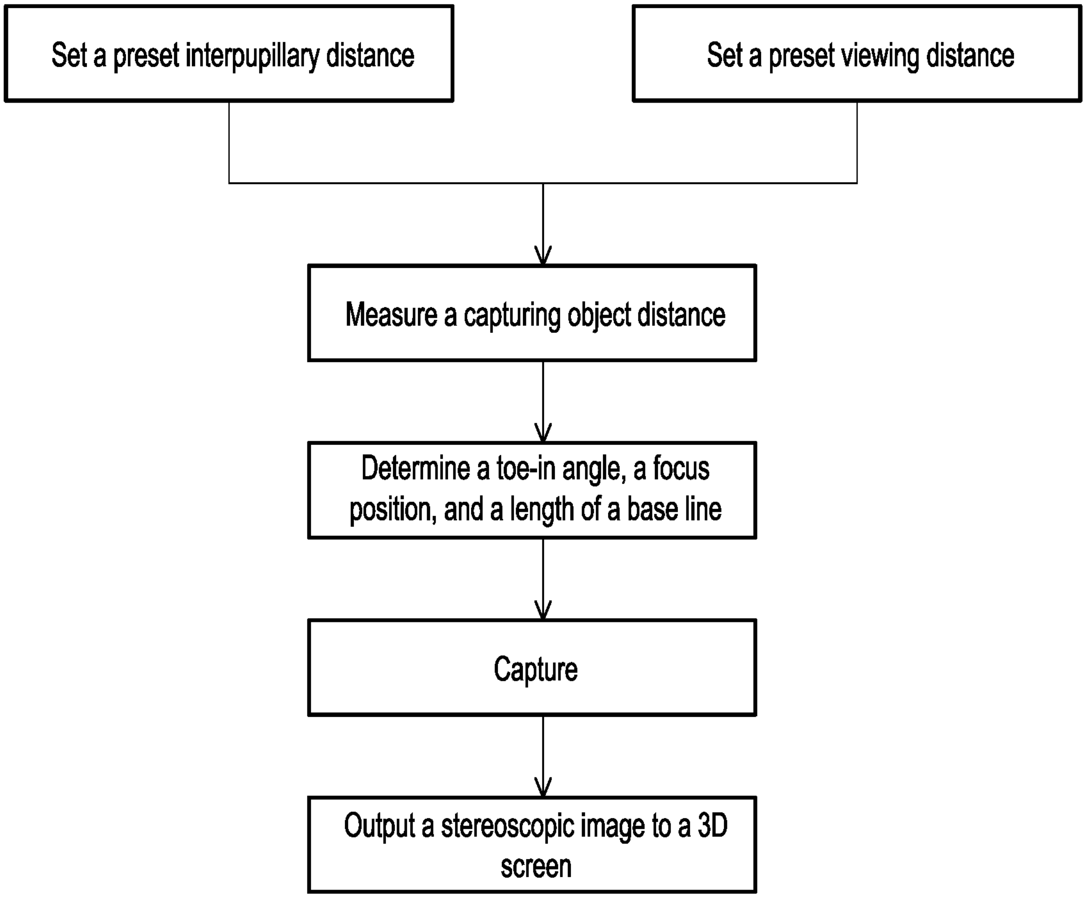
FIG. 8 is a flowchart of a stereoscopic camera device generating a stereoscopic image according to an embodiment of the disclosure.

FIG. 8 is a flowchart of a stereoscopic camera device generating a stereoscopic image according to an embodiment of the disclosure. Please refer to FIG. 8. In the embodiment, the controller controls the first actuator 400 and the second actuator 500 according to the capturing object distance, the preset viewing distance VD, and the preset interpupillary distance to change the toe-in angle θ1 of the first camera 100, the toe-in angle θ2 of the second camera 200, or the distance between the first camera 100 and the second camera 200.

Based on the above, in an embodiment of the disclosure, since the stereoscopic camera device 10B is provided with the distance sensor 600, the stereoscopic camera device 10B may sense the capturing object distance between the base line B and the object O by the distance sensor 600. Therefore, the stereoscopic camera device 10B may change the toe-in angle θ1 of the first camera 100, the toe-in angle θ2 of the second camera 200, or the distance between the first camera 100 and the second camera 200 according to the capturing object distance, the preset viewing distance VD, and the preset interpupillary distance. The remaining advantages of the stereoscopic camera device 10B are similar to those of the stereoscopic camera device 10A and will not be described again here.

Figure 9:
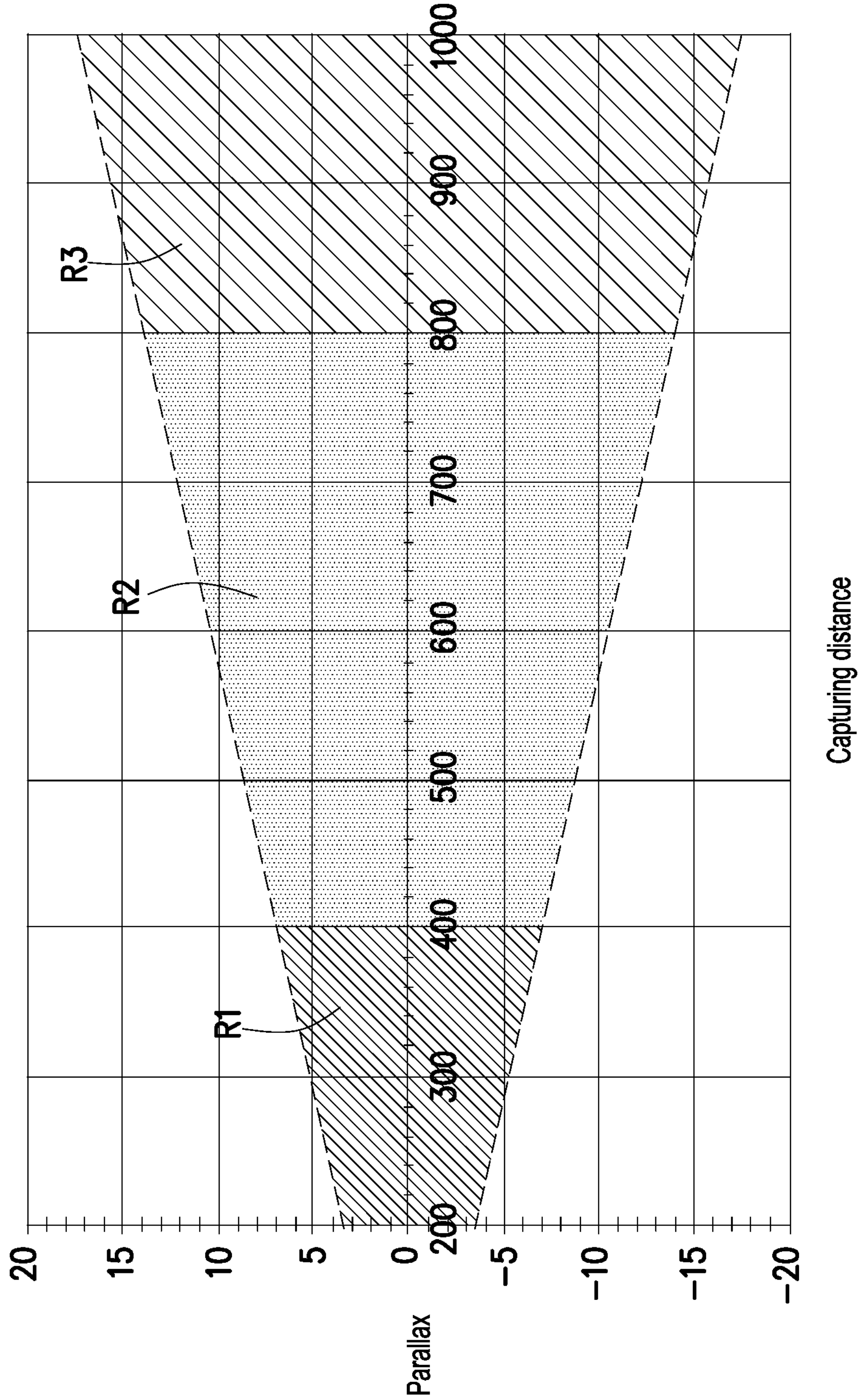
FIG. 9 is a schematic diagram of a display size corresponding to a capturing distance of a stereoscopic camera device according to an embodiment of the disclosure.

FIG. 9 is a schematic diagram of a display size corresponding to a capturing distance of a stereoscopic camera device according to an embodiment of the disclosure. Please refer to FIG. 9. In an embodiment, as the size of the display for presenting the stereoscopic image SI becomes larger, the stereoscopic camera devices 10, 10A, and 10B are suitable for increasing the capturing distance (that is, the shortest distance $Z_{con}$). For example, a region R1 is for viewing the stereoscopic image SI using a small-size screen (for example, a mobile phone, a tablet, etc.) and is suitable for setting the capturing distance to 300±100 mm. A region R2 is for viewing the stereoscopic image SI using, for example, a 15.6-inch screen (for example, a screen of a laptop) and is suitable for setting the capturing distance to 600±200 mm. A region R3 is for viewing the stereoscopic image SI using, for example, a large-size screen such as a television and is suitable for setting the capturing distance to 900±300 mm.

Figure 10:
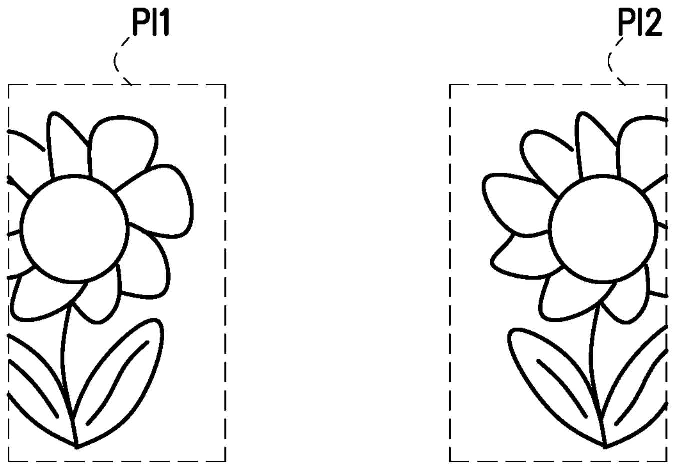
FIG. 10 is a schematic diagram of a stereoscopic camera device generating a processed first image and a processed second image according to an embodiment of the disclosure.
Figure 11:
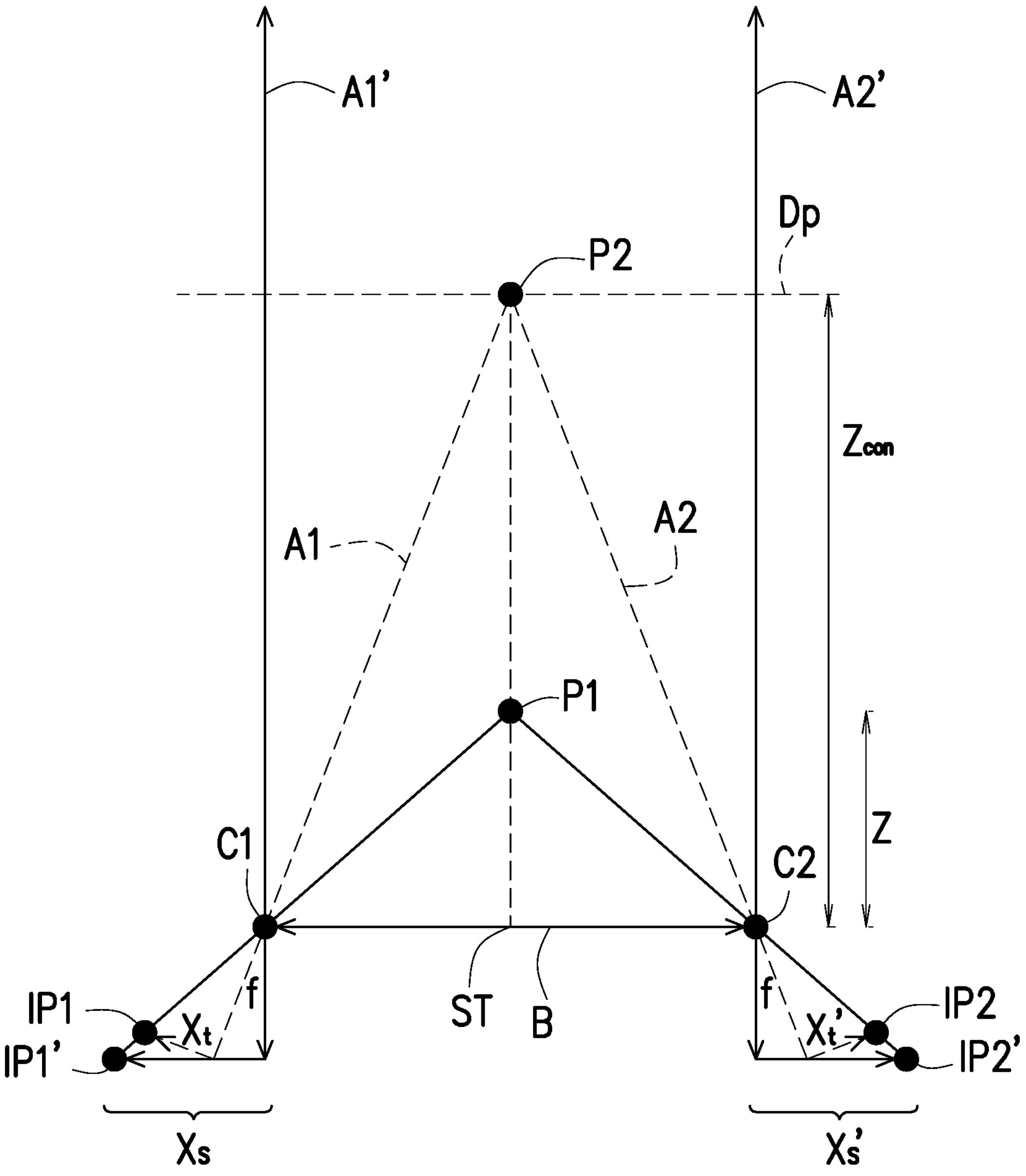
FIG. 11 is a schematic diagram of an object relative to a first camera and a second camera when a stereoscopic camera device captures the object according to an embodiment of the disclosure.

FIG. 10 is a schematic diagram of a stereoscopic camera device generating a processed first image and a processed second image according to an embodiment of the disclosure. FIG. 11 is a schematic diagram of an object relative to a first camera and a second camera when a stereoscopic camera device captures the object according to an embodiment of the disclosure. Please refer to FIG. 10 and FIG. 11 at the same time. In the embodiment, the controller 300 image processes the first image I1 and the second image I2, so that a processed first image PI1 and a processed second image PI2 are equivalent to images captured when the toe-in angles θ1 and θ2 of the optical axis A1 of the first camera 100 and the optical axis A2 of the second camera 200 are greater than 0.

In the embodiment, an optical axis A1' of the first camera 100 and an optical axis A2' of the second camera 200 are parallel to each other and perpendicular to the display surface DP.

In the embodiment, the processed first image PI1 is an image obtained after cropping a part of the first image I1 away from a camera system center ST, and the processed second image PI2 is an image obtained after cropping a part of the second image 12 away from the camera system center ST. The camera system center ST is a center of the straight line formed between the first camera 100 and the second camera 200. For example, in FIG. 10, the processed first image PI1 is the first image I1 with a left part cropped, and the effect is equivalent to the optical axis A1' of the first camera 100 rotating to the right to form the toe-in angle θ1 as shown in FIG. 1. The processed second image PI2 is the second image 12 with a right part cropped, and the effect is equivalent to the optical axis A2' of the second camera 200 rotating to the left to form the toe-in angle θ2 as shown in FIG. 1.

In the embodiment, the controller 300 executes the following conversion on the first image I1 and the second image 200 to generate the processed first image PI1 and the processed second image PI2:

$$x_t = x_s\left(\frac{1-\frac{Z}{Z_{con}}}{1+\frac{B'^2}{4ZZ_{con}}}\right), \text{ and}$$

-continued $$x_t' = x_s'\left(\frac{1-\frac{Z}{Z_{con}}}{1+\frac{B'^2}{4ZZ_{con}}}\right)$$

where $x_t$ is the distance between the first image I1 at the imaging point IP1 of the first camera 100 and the optical axis A1 of the first camera 100 when the toe-in angle θ1 of the optical axis A1 of the first camera 100 is greater than 0, $x_t'$ is the distance between the second image I2 at the imaging point IP2 of the second camera 200 and the optical axis A2 of the second camera 200 when the toe-in angle θ2 of the optical axis A2 of the second camera 200 is greater than 0, $x_s$ is a distance between the first image I1 at an imaging point IP1' of the first camera 100 and the optical axis A1' of the first camera 100 when the toe-in angle of the optical axis A1' of the first camera 100 is equal to 0, and $x_s'$ is a distance between the second image I2 at an imaging point IP2' of the second camera 200 and the optical axis A2' of the second camera 200 when the toe-in angle of the optical axis A2' of the second camera 200 is equal to 0.

In other words, as shown in FIG. 10, the parts of the first image I1 and the second image I2 away from the camera system center ST are cropped to generate the effect of rotation of the optical axis A1' of the first camera 100 and the optical axis A2' of the second camera 200. However, only synthesizing the cropped images causes the stereoscopic image SI to be deformed. Therefore, the stereoscopic camera device further executes the ($x_t$, $x_t'$) conversion, so that the processed first image PI1 and the processed second image PI2 can be close to the first image I1 and the second image I2 captured when the toe-in angle θ1 of the optical axis A1 of the first camera 100 is greater than 0 and the toe-in angle θ2 of the optical axis A2 of the second camera 200 is greater than 0.

In summary, in an embodiment of the disclosure, the stereoscopic camera device includes the first camera, the second camera, and the controller. The first camera and the second camera may be controlled, so that the toe-in angles of the optical axis of the first camera and the optical axis of the second camera are greater than 0. Alternatively, the controller image processes the first image and the second image, so that the processed first image and the processed second image are equivalent to the images captured when the toe-in angles of the optical axis of the first camera and the optical axis of the second camera are greater than 0. Therefore, the stereoscopic camera device can present the stereoscopic image in front of or behind the 3D screen, and the stereoscopic camera device can be suitable for close-range capturing.

In addition, in the embodiment of the disclosure, the capturing manner of the stereoscopic camera device is designed such that the difference value between the included angle formed by the first straight line and the second straight line and the included angle formed by the third straight line and the second straight line falls between ±0.5 degrees, which can effectively reduce visual vergence-accommodation conflict of the stereoscopic image. Therefore, the stereoscopic camera device can provide optimal stereoscopic visual effects.

What is claimed is:

1. A stereoscopic camera device, comprising:

a first camera, configured to capture toward an object to obtain a first image of the object;

a second camera, configured to capture toward the object to obtain a second image of the object; and a controller, electrically connected to the first camera and the second camera, wherein the controller synthesizes the first image and the second image to generate a stereoscopic image of the object, wherein:

by the controller, the first camera and the second camera are controlled, so that toe-in angles of an optical axis of the first camera and an optical axis of the second camera are greater than 0, wherein when the toe-in angles are greater than 0:

a difference value between an included angle formed by a first straight line and a second straight line and an included angle formed by a third straight line and the second straight line falls between ±0.5 degrees, wherein a straight line formed between an imaging position of the stereoscopic image of the object and a position of a preset left eye or a preset right eye is the first straight line, a straight line formed perpendicular to a connection direction between the position of the preset left eye and the position of the preset right eye and toward a direction of the stereoscopic image is the second straight line, and a straight line formed between a center of sight of the preset left eye and the preset right eye on a display surface and the position of the preset left eye or the preset right eye is the third straight line, an intersection position of the optical axis of the first camera and the optical axis of the second camera falls on the display surface, the display surface is parallel to a base line, and a straight line formed between the first camera and the second camera is the base line; or the controller image processes the first image and the second image, so that the processed first image and the processed second image are equivalent to images captured when the toe-in angles of the optical axis of the first camera and the optical axis of the second camera are greater than 0.

2. The stereoscopic camera device according to claim 1, wherein when the toe-in angles are greater than 0:

a distance between an imaging position of the stereoscopic image of the object and the display surface is greater than 0.

3. The stereoscopic camera device according to claim 1, wherein when the toe-in angles are greater than 0:

the controller determines a length of the base line according to a shortest distance between the display surface and the base line, a preset viewing distance, and a base line function, wherein the preset viewing distance is a distance between the position of the preset left eye or the preset right eye and the display surface, and the base line function is:

$$(x_t - x_t') = f\left(\frac{\frac{B'}{Z} - \frac{B'}{Z_{con}}}{1 + \frac{B^2}{4ZZ_{con}}}\right)$$

where $(x_t-x_t')$ is a parallax between the first image and the second image, $x_t$ is a distance between the first image at an imaging point of the first camera and the optical axis of the first camera, $x_t'$ is a distance between the second image at an imaging point of the second camera and the optical axis of the second camera, f is a focal length of the first camera and the second camera, B' is a length of the base line, Z is a shortest distance between the object and the base line, and $Z_{con}$ is the shortest distance between the display surface and the base line.

4. The stereoscopic camera device according to claim 1, wherein when the toe-in angles are greater than 0:

the controller determines a capturable range of the object according to a shortest distance between the display surface and the base line, a preset viewing distance, and a base line function, wherein the preset viewing distance is a distance between the position of the preset left eye or the preset right eye and the display surface, and the base line function is:

$$(x_t - x_t') = f\left(\frac{\frac{B'}{Z} - \frac{B'}{Z_{con}}}{1 + \frac{B^2}{4ZZ_{con}}}\right)$$

where $(x_t-x_t')$ is a parallax between the first image and the second image, $x_t$ is a distance between the first image at an imaging point of the first camera and the optical axis of the first camera, $x_t'$ is a distance between the second image at an imaging point of the second camera and the optical axis of the second camera, f is a focal length of the first camera and the second camera, B' is the length of the base line, Z is a shortest distance between the object and the base line, and $Z_{con}$ is the shortest distance between the display surface and the base line.

5. The stereoscopic camera device according to claim 1, further comprising:

a first actuator, connected to the first camera and electrically connected to the controller, the first actuator being configured to change an angle of the optical axis of the first camera and a position of the first camera; and a second actuator, connected to the second camera and electrically connected to the controller, the second actuator being configured to change an angle of the optical axis of the second camera and a position of the second camera.

6. The stereoscopic camera device according to claim 5, wherein when the toe-in angles are greater than 0:

the controller controls the first actuator and the second actuator according to a capturing object distance, a preset viewing distance, and a preset interpupillary distance to change the toe-in angle of the first camera, the toe-in angle of the second camera, or a distance between the first camera and the second camera.

7. The stereoscopic camera device according to claim 6, wherein the distance between the first camera and the second camera is proportional to a capturing distance.

8. The stereoscopic camera device according to claim 5, further comprising:

a distance sensor, electrically connected to the controller, the distance sensor being configured to sense the capturing object distance between the base line and the object.

9. The stereoscopic camera device according to claim 8, wherein when the toe-in angles are greater than 0:

the controller controls the first actuator and the second actuator according to the capturing object distance, a preset viewing distance, and a preset interpupillary distance to change the toe-in angle of the first camera, the toe-in angle of the second camera, or a distance between the first camera and the second camera.

10. The stereoscopic camera device according to claim 1, wherein as a size of a display for presenting the stereoscopic image becomes larger, the stereoscopic camera device is suitable for increasing a capturing distance.

11. The stereoscopic camera device according to claim 1, wherein when the controller image processes the first image and the second image, so that the processed first image and the processed second image are equivalent to the images captured when the toe-in angles of the optical axis of the first camera and the optical axis of the second camera are greater than 0, the optical axis of the first camera and the optical axis of the second camera are parallel to each other and perpendicular to the display surface.

12. The stereoscopic camera device according to claim 11, wherein the processed first image is an image after cropping a part of the first image away from a camera system center, and the processed second image is an image after cropping a part of the second image away from the camera system center, wherein the camera system center is a center of the straight line formed between the first camera and the second camera.

13. The stereoscopic camera device according to claim 11, wherein the controller executes a transformation on the first image and the second image to generate the processed first image and the processed second image:

$$x_t = x_s\left(\frac{1-\frac{Z}{Z_{con}}}{1+\frac{B'^2}{4ZZ_{con}}}\right), \text{ and}$$

$$x_t' = x_s'\left(\frac{1-\frac{Z}{Z_{con}}}{1+\frac{B'^2}{4ZZ_{con}}}\right)$$

where $x_t$ is a distance between the first image at an imaging point of the first camera and the optical axis of the first camera when the toe-in angle of the optical axis of the first camera is greater than 0, $x_t'$ is a distance between the second image at an imaging point of the second camera and the optical axis of the second camera when the toe-in angle of the optical axis of the second camera is greater than 0, $x_s$ is a distance between the first image at an imaging point of the first camera and the optical axis of the first camera when the toe-in angle of the optical axis of the first camera is equal to 0, $x_s'$ is a distance between the second image at an imaging point of the second camera and the optical axis of the second camera when the toe-in angle of the optical axis of the second camera is equal to 0, B' is a length of the base line, Z is a shortest distance between the object and the base line, and $Z_{con}$ is a shortest distance between the display surface and the base line.

* * * * *